Patented July 11, 1939

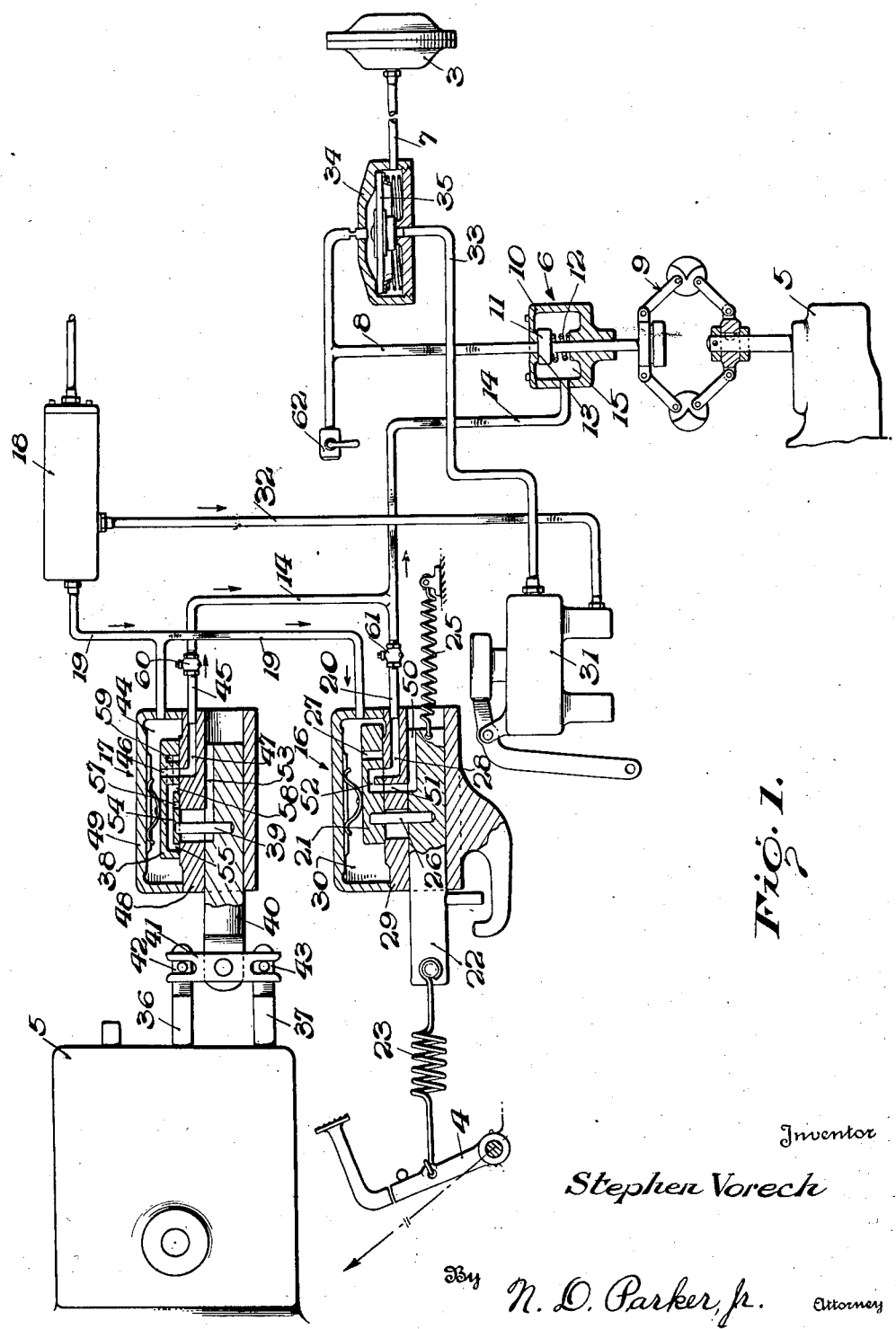

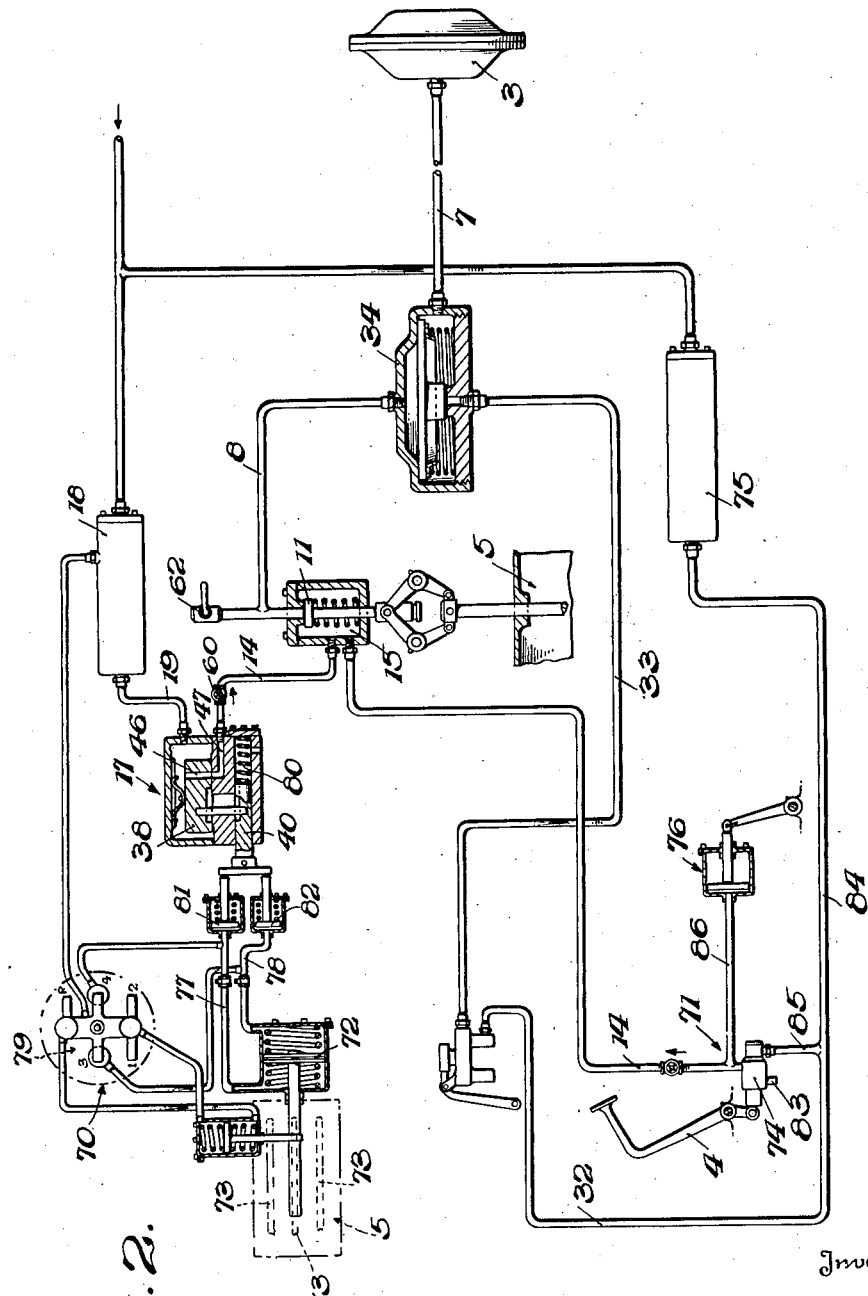

2,166,029

UNITED STATES PATENT OFFICE 2,166,029

VEHICLE CONTROL MECHANISM

Stephen Vorech, Pittsburgh, Pa., assignor to Bendix-Westinghouse Automotive Air Brake Company, Pittsburgh, Pa., a corporation of Delaware Application March 5, 1937, Serial No. 129,255

16 Claims. (Cl. 192—4)

This invention relates to vehicle-controlling systems and more particularly to a safety arrangement for motor vehicles, whereby excessive speeds thereof under certain conditions, are prevented.

One of the objects of the present invention is to provide a safety system for motor vehicles for preventing coasting of the vehicle down grade at excessive speeds.

Another object of the invention is to limit the speed attainable by a motor vehicle when operated with the clutch disengaged.

Still another object is to provide a mechanism of the above character which shall be so constructed and arranged that the vehicle brakes will be automatically applied after the vehicle has attained a predetermined speed, providing the operator, after such speed has been reached, effects a disengagement of the clutch or shifts the transmission to neutral position.

A further object is to provide, in a safety system of the above type, a novel arrangement including a fluid pressure braking system which may be manually operated in the usual manner and regardless of vehicle speed, or may be automatically operated when the operator attempts to coast down grade at an excessive speed.

Other objects and features of novelty will appear more fully hereinafter from the following detailed description when taken in connection with the accompanying drawings illustrating two forms of the invention. It is to be expressly understood, however, that the drawings are employed for purposes of illustration only and are not designed as a definition of the limits of the invention, reference being had for this purpose to the appended claims.

Referring to the drawings, wherein similar reference character denote similar parts throughout the several views:

Fig. 1 is a diagrammatic view, partly in section, of a vehicle-controlling system constructed in accordance with the present invention, and Fig. 2 is a similar view of a slightly modified form illustrating the invention in connection with a power-operated transmission and clutch.

Referring more particularly to Fig. 1, a motor vehicle safety system embodying the principles of the present invention is disclosed therein as including a fluid pressure braking device 3 which may be energized by suitable means, to be described in detail hereinafter, when the speed of the motor vehicle exceeds a predetermined speed and providing a clutch-controlling member 4 is moved to clutch-disengaged position and/or the vehicle transmission 5 is moved to a neutralized position.

As shown, the braking device 3 is connected to a centrifugally-operable valve mechanism 6, as by means of conduits 7 and 8, said valve mechanism being suitably controlled by a centrifugally-operable device 9 which is connected to the tail shaft of the transmission 5. More particularly, the valve mechanism 6 includes a casing 10 having a valve element 11 therein which is normally urged by a spring 12 to such a position as to contact a seat 13 formed in said casing. The valve 11, when closed, interrupts communication between conduit 8 and a conduit 14, the latter communicating with valve chamber 15 and valvular mechanisms 16 and 17, respectively associated with the vehicle clutch-controlling member and the vehicle transmission.

In order that fluid pressure may be admitted to the valve chamber 15 when the clutch-controlling member 4 is moved to clutch-disengaging position, the valve 16 is adapted to control the flow of fluid pressure from a suitable reservoir 18 to conduit 14 by way of conduits 19 and 20. As shown, the valve mechanism 16 includes a slide valve 21 connected to a slide 22, the latter being associated through spring 23 with the clutch-controlling element 4. With the parts in the position shown, a spring 25 normally maintains the slide 22 and valve 21 in such a position that the communication between conduits 19 and 20 is cut off. However, upon clutch-disengaging movement of the member 4, slide valve 21 connected to the slide 22 by means of pin 26, will be moved to the left, as shown in Fig. 1, in order to connect port 27 with bore 28 formed in housing 29 of the valve 16. In this manner, the chamber 30 of the valve, communicating at all times with conduit 19, will be connected with conduit 20, and fluid pressure will thus be conducted from the reservoir 18 to the valve chamber 15. In the event that the vehicle speed is such as to effect opening of the valve 11, fluid pressure will be conducted to the brake device 3 by way of conduits 8 and 7.

It is desirable that manual control of the brakes be had in the usual manner, irrespective of the automatic braking operation above described. For this purpose, a brake valve 31, of any suitable construction, is connected with the reservoir 18 by means of conduit 32, the said valve controlling the flow of fluid pressure to the brake device through conduit 33. A double check valve 34, having a diaphragm 35 therein, is connected at the junction of conduits 8 and 33 in order to permit fluid flow to the brake device from either conduit.

For the purpose of conducting fluid pressure to the valve chamber 15 when the transmission 5 is moved to a neutralized position, the valve 17 is so associated with the shift rods 36 and 37 of the transmission as to permit flow of fluid pressure to said valve chamber whenever both of the shift rods are moved to a neutral position. As shown, the valve mechanism 17 includes a slide valve 38 connected by pin 39 and slide 40 to a link 41, the latter being associated with each shift rod through pin and slot connections 42 and 43. With such an arrangement, movement of either shift rod away from the neutral position illustrated in Fig. 1 will move valve 38 to such a position that communication between valve chamber 44 and conduit 45 will be disestablished. However, with the parts in the position illustrated, chamber 44 is connected with conduit 45 through bore 46, formed in the valve 38, and duct 47, formed in a stationary portion 48 of the valve casing 49. Thus it will be appreciated that, so long as the transmission is in neutral position, fluid pressure will be conveyed from the reservoir 18 to the valve chamber 15 by way of open valve 17.

In order to prevent automatic operation of the brakes due to leakage of the valves 16 and 17 when the vehicle is operating at speeds above that for which the valve 6 is set to open, each of the valves 16 and 17 is so constituted that, under such conditions, the conduits 20 and 45 connecting said valves to the valve chamber 15, are connected to atmosphere. More particularly, and referring to valve 16, it will be observed that the slide 22 is provided with a bore 50 communicating with bore 28 through a duct 51, positioned in the stationary housing portion 29 and a duct 52 formed in the slide valve 21. Such an arrangement enables the exhausting of any fluid pressure from chamber 30 directly to atmosphere in the event that there is any leakage past the valve 21 and into conduit 20. This arrangement prevents the building-up of fluid pressure in the brake device which might otherwise cause a slight application of the vehicle brakes when the vehicle is operated at speeds above that for which the valve 11 is set to open.

With regard to the valve 17, it will be noted that the slide 40 has a bore 53 formed therein which is adapted to communicate with a duct 54 formed in the slide valve 38, through openings 55 or 57 whenever the transmission is moved to a gear-engaged position. The duct 54 is also provided with a connection 58 and, moreover, communicates with a bore 59, the connection and bore being adapted to selectively connect the duct 54 to the bore 47 upon actuation of either shift rod to a gear-engaged position. With such an arrangement, it will be understood that the duct 47 is connected to atmosphere whenever the transmission is in gear, and thus the passage of fluid pressure from chamber 44 past the valve to the duct 47, due to leakage of the valve, which would otherwise be conducted to the braking device 3, is exhausted.

Means are provided for preventing exhausting of fluid pressure from the reservoir when one or the other of the valves 16 and 17 is moved to such a position that the fluid line controlled thereby is exhausted through that particular valve. For this purpose, suitable check valves 60 and 61 are inserted in conduits 45 and 20 respectively.

In operation of the system described above, it will be readily understood that the brakes will not be automatically applied until the vehicle has attained a predetermined speed, as for example 45 miles per hour. Even at greater speeds than said predetermined speed, the brakes will not be applied except in the event that the clutch is moved to disengaged position or the transmission is neutralized. In the event that the clutch is disengaged, fluid pressure from the reservoir 18 will be promptly conducted through conduit 19 to the valve chamber 30 and thereafter will be led to the braking device 3 by way of communicating ducts 27, 28, conduit 20, open valve 6, conduit 8 and double check valve 34. Due to the utilization of a diaphragm 35 in the double check valve 34, when the brakes are automatically applied, they cannot be released by mere engagement of the clutch pedal and the resultant exhausting of conduit 20. After the vehicle has come to a stop, the conduit 8 may be exhausted by a manually-operable valve 62, whereupon the release of pressure from the double check valve 34 will enable the brake device to exhaust through line 33 and to the atmosphere via the exhaust port of the brake valve 31.

Substantially the same operation as above described will occur when the transmission is neutralized at a speed above that for which the valve 6 is set to open. In such event, fluid pressure from the reservoir 18 will be conducted through conduit 19 directly to conduit 45 through communicating ducts 46 and 47, it being understood that, when the transmission is neutralized, the parts occupy the position shown in Fig. 1 and the aforementioned ducts are in registry. Fluid pressure from conduit 45 will be conducted to the brake device by conduit 14, valve 6, conduit 8 and double check valve 34. The arrangement thus provides a safety system in that it prevents coasting of the vehicle at speeds above which such operation is considered dangerous.

Referring to that form of the invention illustrated in Fig. 2, the invention heretofore described has been associated with a fluid pressure-controlled gear shifting mechanism 70 and a fluid pressure-operated clutch device 71. The transmission control may be of any suitable type wherein a pressure-controlled piston 72 is provided for selectively moving one of a plurality of transmisison gear-shifter bars 73. The fluid pressure-controlling clutch device 71 may be constructed in any suitable manner, it being necessary only to effect a connection between conduit 14, leading to the valve chamber 15, and a valve 74, the latter being adapted to connect a reservoir 75 with a clutch motor 76 whenever the clutch-controlling member 4 is moved to such a position as to effect disengagement of the vehicle clutch. The system disclosed in Fig. 2 is similar in other respects to that disclosed in Fig. 1 and it is, therefore, believed that a detailed description thereof is not necessary.

In the operation of the arrangement shown in Fig. 2, whenever the shifter piston 72 is in neutral position, the conduits 77 and 78 associated with opposite ends thereof will be connected with atmosphere through the control box 79. The slide 40 associated with valve 17 will thus be moved to the position shown as by means of a spring 80, reservoir 18 being thus connected through conduit 19 with conduit 14 by registry of duct 46 and bore 47. However, when fluid pressure is conducted to either end of the transmission shifter device 72, for the purpose of establishing a selected gear relation, one or the other of the pistons 81 or 82 will be moved to the right, as viewed in this figure, and will operate slide valve 38 in order to disconnect bore 46 and duct 47. It will thus be appreciated that, as long as the transmission is placed in a gear-engaged position, there will be no communication between reservoir 18 and valve chamber 15 by way of valve 17. However, should the transmission be moved to neutral position, such communication will be established, and, should the centrifugally-operable valve 11 be moved from its seat, due to the attainment of a predetermined vehicle speed, the brake device 3 will be automatically supplied with fluid pressure through conduits 8 and 7 by way of the double check valve 34.

On the other hand, it will be likewise observed that, so long as the clutch pedal 4 is maintained in engaged position, conduit 14 will be connected to the atmospheric connection 83 of the clutch valve 74. However, should the clutch valve be operated to effect disengagement of the vehicle clutch at a speed above that for which valve 11 is set to open, fluid pressure will be conducted from reservoir 75, not only to the clutch motor 76, by means of conduits 84, 85 and 86, but also to the valve chamber 15 by way of conduit 14, thus effecting an automatic application of the brakes.

There is thus provided by the present invention an arrangement which will prevent an operator from coasting a vehicle above a certain predetermined speed. At speeds above which the centrifugally-operable valve has been set, the brakes will be automatically applied as soon as the operator disengages the clutch or neutralizes the transmission. Without the present invention, vehicles may be operated at high rates of speed with a disengaged clutch or a neutralized transmission, and a vehicle operated in such a manner not only constitutes a traffic hazard, by reason of the lack of control which the operator exerts thereon, but also suffers mechanically, when the clutch is reengaged. By the use of the invention described herein, these objections are overcome by the automatic application of the vehicle brakes as soon as the operator attempts to coast the vehicle when such operation is dangerous.

While two embodiments of the invention have been shown and described herein, it is to be understood that the invention is not limited thereto but may be embodied in various forms as well understood by those skilled in the art. Reference will therefore be had to the appended claims for a definition of the limits of the invention.

What is claimed is:

1. In a speed-controlling mechanism for vehicles, the combination of a fluid brake device, means responsive to a predetermined speed of the vehicle for supplying fluid pressure to said brake device, and means including a vehicle clutch-controlling device movable to clutch-disengaged position for supplying fluid pressure to said first named means.

2. In a speed-controlling mechanism for vehicles, the combination of a fluid brake device, means responsive to a predetermined speed of the vehicle for supplying fluid pressure to said brake device, and means including a vehicle transmission device movable to neutral position for supplying fluid pressure to said first named means.

3. In a speed-controlling mechanism for vehicles, the combination of a fluid brake device, means responsive to a predetermined speed of the vehicle for supplying fluid pressure to said brake device, valve means for controlling the application of fluid pressure to said first named means, and means for controlling the vehicle and for operating said valve means.

4. In a speed-controlling mechanism for vehicles, the combination of a fluid brake device, a valve for supplying fluid pressure to said device, means responsive to a predetermined vehicle speed for operating said valve, and an element operable for controlling the vehicle and for connecting said valve with a source of fluid pressure.

5. In a speed-controlling mechanism for vehicles, the combination of a fluid brake device, a valve for supplying fluid pressure to said device, means responsive to a predetermined vehicle speed for operating said valve, and a vehicle clutch-controlling element movable to clutch-disengaged position for connecting said valve with a source of fluid pressure.

6. In a speed-controlling mechanism for vehicles, the combination of a fluid brake device, a valve for supplying fluid pressure to said device, means responsive to a predetermined vehicle speed for operating said valve, and a vehicle transmission device movable to neutral position for connecting said valve with a source of fluid pressure.

7. In a speed-controlling mechanism for vehicles, the combination of a fluid brake device, a valve for supplying fluid pressure to said device, means responsive to a predetermined vehicle speed for operating said valve, a second valve for connecting the first valve with a source of fluid pressure, and means for controlling the vehicle and for operating said second valve.

8. In a fluid pressure braking system for vehicles having a fluid pressure brake device, a clutch-controlling member, and means operable upon clutch-disengaging movement of said member above a predetermined vehicle speed for automatically energizing said brake device.

9. In a fluid pressure braking system for vehicles having a fluid pressure brake device, a ratio-changing transmission, and means operable upon neutralization of said transmission above a predetermined vehicle speed for automatically energizing said brake device.

10. In a fluid pressure braking system for vehicles having a fluid pressure brake device, a fluid pressure reservoir, means including a pair of valves for connecting said device and reservoir, means responsive to vehicle speed for opening one of said valves, and a member for controlling the vehicle and for opening the other of said valves.

11. In a fluid pressure braking system for vehicles having a fluid pressure brake device, a fluid pressure reservoir, means including a pair of valves for connecting said device and reservoir, means responsive to vehicle speed for opening one of said valves, and a vehicle clutch-controlling member for opening the other of said valves.

12. In a fluid pressure braking system for vehicles having a fluid pressure brake device, a fluid pressure reservoir, means including a pair of valves for connecting said device and reservoir, means responsive to vehicle speed for opening one of said valves, and vehicle transmission control means for opening the other of said valves when said transmission control means is moved to neutral position.

13. In a speed-controlling mechanism for vehicles, the combination of a fluid brake device, vehicle control devices, manually-operable means for supplying fluid pressure to said brake device, and means for automatically supplying fluid pressure to said brake device above a predetermined vehicle speed, said last named means including an element separate from said manually-operable means for operating one of said devices.

14. In a speed-controlling mechanism for vehicles, the combination of a fluid brake device, manually-operable means for supplying fluid pressure to said brake device, an element for normally controlling the operation of the vehicle, and means for automatically supplying fluid pressure to said brake device comprising a pair of valves in series, one of said valves being controlled by the vehicle speed while the other of said valves is controlled by said element.

15. In combination with a motor vehicle having a fluid brake device, a transmission and a clutch-controlling apparatus, means operable upon neutralization of said transmission and clutch-disengagement movement of said apparatus above a predetermined vehicle speed for energizing said device.

16. In combination with a motor vehicle having a brake device, a pair of vehicle-controlling elements, and means for energizing said device including mechanism controlled by movement of either element to a predetermined position together with mechanism operable at a predetermined vehicle speed.

STEPHEN VORECH.